United States Patent [19]

Matsumoto

[11] Patent Number: 4,845,551
[45] Date of Patent: * Jul. 4, 1989

[54] METHOD FOR CORRECTING COLOR PHOTOGRAPHIC IMAGE DATA ON THE BASIS OF CALIBRATION DATA READ FROM A REFERENCE FILM

[75] Inventor: Fumio Matsumoto, Tokyo, Japan

[73] Assignee: Fuji Photo Film Co., Ltd., Minami-ashigara, Japan

[*] Notice: The portion of the term of this patent subsequent to May 19, 2004 has been disclaimed.

[21] Appl. No.: 865,863

[22] Filed: May 22, 1986

[30] Foreign Application Priority Data

May 31, 1985 [JP] Japan .................................. 60-117901

[51] Int. Cl.$^4$ .................. G03F 3/08; G03B 27/73; H04N 5/228; H04N 9/73
[52] U.S. Cl. ................................... 358/80; 358/29; 358/163; 355/38
[58] Field of Search .............. 358/29 C, 163, 80, 280, 358/284; 355/38

[56] References Cited

U.S. PATENT DOCUMENTS

| | | | |
|---|---|---|---|
| 4,037,249 | 7/1977 | Pugsley | 358/80 |
| 4,274,732 | 6/1981 | Thurm et al. | 355/38 |
| 4,448,521 | 5/1984 | Shiota | 355/38 |
| 4,524,388 | 6/1985 | Abe et al. | 358/163 |
| 4,554,583 | 11/1985 | Saijoh et al. | 358/163 |
| 4,608,595 | 8/1986 | Nakayama et al. | 358/29 C |
| 4,610,537 | 9/1986 | Matsumoto | 355/68 |
| 4,626,903 | 12/1986 | Giesche et al. | 358/80 |
| 4,647,961 | 3/1987 | Kammoto et al. | 358/29 C |
| 4,650,316 | 3/1987 | Matsumoto | 355/55 |
| 4,666,306 | 5/1987 | Matsumoto | 355/38 |
| 4,666,307 | 5/1987 | Matsumoto et al. | 355/38 |

FOREIGN PATENT DOCUMENTS

| | | | |
|---|---|---|---|
| 0138024 | 4/1985 | European Pat. Off. | 358/284 |
| 52-52523 | 4/1977 | Japan | 358/29 C |
| 54-20614 | 2/1979 | Japan | 358/1634 |
| 54-158115 | 12/1979 | Japan | 358/163 |
| 55-39418 | 3/1980 | Japan | 358/29 C |
| 55-79567 | 6/1980 | Japan | 358/163 |
| 55-112685 | 8/1980 | Japan | 358/163 |
| 57-210775 | 12/1982 | Japan | 358/280 |
| 58-12473 | 1/1983 | Japan | 358/163 |
| 58-15381 | 1/1983 | Japan | 358/29 C |
| 60-51369 | 3/1985 | Japan | 358/78 |
| 60-54569 | 3/1985 | Japan | 358/80 |
| 60-96955 | 5/1985 | Japan | 358/80 |
| 60-149261 | 8/1985 | Japan | 358/163 |

*Primary Examiner*—James J. Groody
*Assistant Examiner*—Randall S. Svihla
*Attorney, Agent, or Firm*—Wenderoth, Lind & Ponack

[57] ABSTRACT

Data regarding color photographic images are detected with respect to three primary colors (red, green and blue) by receiving transmitted light through a color original film or light reflected thereon with respect to the three colors by an image sensor and detecting the image data of the original film with respect to the picture elements obtained by dividing the whole picture surface of the film. In this method, the image data is corrected in accordance with a manner in which image data of a reference film corresponding to the original film with respect to three primary colors is detected respectively by the image sensor and the thus detected data is preliminarily stored in the memory unit as calibration data. In connection with the calibration data, the image data of the original film is operated upon and processed every time that the image data of the original film is detected by the image sensor, whereby corrected image data is obtained. In practice, the image data is digitized and a subtraction method is utilized to subtract previously stored digital correction data obtained by scanning the reference film from the image data of the original film.

5 Claims, 5 Drawing Sheets

FIG. 3
PRIOR ART
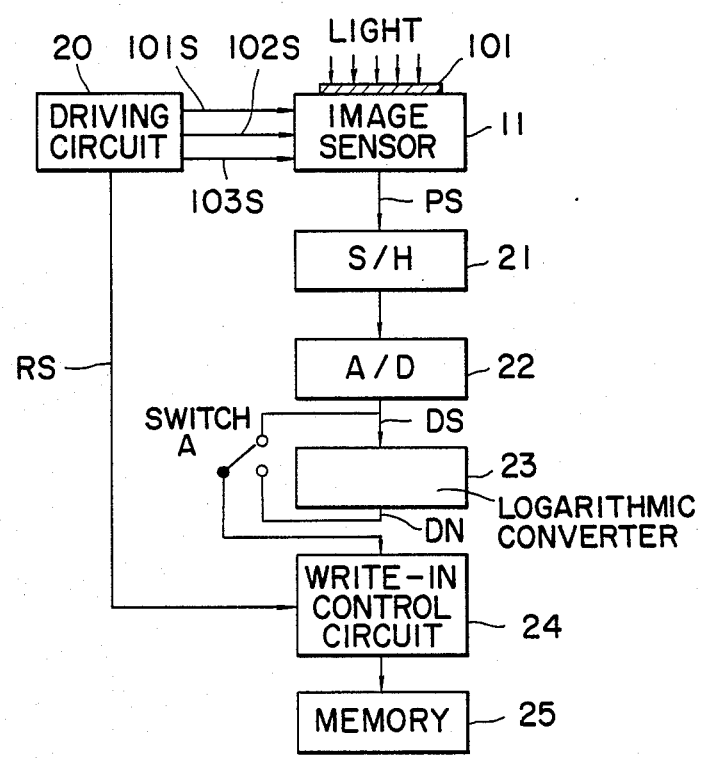
FIG. 4A
PRIOR ART
FIG. 4B
PRIOR ART
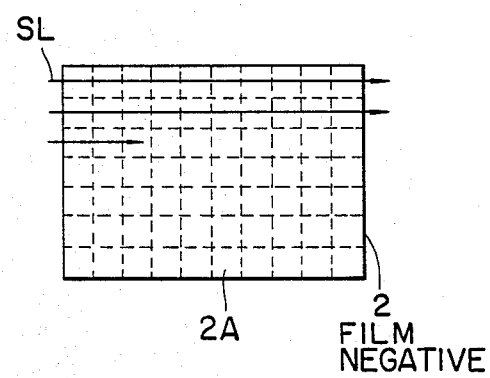

MEMORY 25

| 0 | 0 | 0 | 1 | 0 | 0 |
|---|---|---|---|---|---|
| 0 | 0 | 1 | 0 | 1 | 1 |
| 0 | 0 | 2 | 0 | 1 | 0 |
| 0 | 0 | 0 | 1 | 1 | 0 |
| 0 | 1 | 0 | 2 | 0 | 0 |
| 1 | 1 | 0 | 1 | 0 | 0 |
| 0 | 0 | 0 | 0 | 0 | 1 |

Sij

MEMORY 25

| 16 | 59 | 58 | 54 | 43 | 31 |
|----|----|----|----|----|----|
| 12 | 57 | 55 | 55 | 57 | 12 |
| 17 | 55 | 53 | 51 | 55 | 16 |
| 15 | 52 | 52 | 46 | 52 | 20 |
| 14 | 48 | 48 | 44 | 49 | 23 |
| 11 | 46 | 46 | 44 | 49 | 27 |
| 5  | 17 | 17 | 16 | 45 | 29 |

FILM NEGATIVE

METHOD FOR CORRECTING COLOR PHOTOGRAPHIC IMAGE DATA ON THE BASIS OF CALIBRATION DATA READ FROM A REFERENCE FILM

BACKGROUND OF THE INVENTION

This invention relates to a method for correcting color photographic image data in the case of detecting image data for pixels of a whole frame on an original color film such as a film negative which is generally used in a photographic printer.

It is necessary to photometrically measure the density of an original film such as a film negative in order to determine the printing exposure value or correction value thereof in a photographic printing system. In the prior art, the film negative has its LATD (Large Area Transmittance Density) measured by means of photosensors such as photodiodes provided near an optical path in the photographic printing system. The LATD method, however, is an image detection method used to photometrically measure the film negative generally but does not measure the image density of the film negative correctly or across the whole frame. The printing exposure value or correction value obtained by the LATD method therefore does not quite meet strict requirements. When the film negative image is printed on a photographic paper, it is necessary to change the exposure value or correction value depending on the size, manufacturer or sensitivity of the film negative due to the different in light diffusion particular to each film. These differences are conventionally observed and determined macroscopically and inputted manually from a keyboard or determined by a separate device, and the signals thereof are read out from a data transmission medium. Such key manipulation or signal processing is not only cumbersome but susceptible to input errors.

FIG. 1 shows a system which has been proposed by this applicant to solve the problems encountered in the prior art.

A film negative 2 is conveyed by a conveying mechanism 9 to a position on a film negative carrier 1. The film negative 2 is illuminated by the light from a light source 4 via a color compensation means 3 which comprises 3-primary color filters of yellow (Y), magenta (M) and cyan (C). The light transmitted through the film negative 2 is directed to reach a photographic paper 7 via a lens unit 5 and a black shutter 6. The photographic paper 7 is wound around a supply reel 7A and reeled on a take-up reel 7B in synchronism with the movement and suspension of the film negative 2. Photosensors 8 such as photodiodes are provided near the lens unit 5 of the film negative 2 in order to detect image density data of three primary colors. In accordance with the detection signals from such photosensors 8, picture printing is carried out. An image data detecting apparatus 10 comprising a two-dimensional image sensor 11 is positioned near the film negative 2 at a position inclined from an optical axis LS of the light source 4 and the film negative 2. A lens unit 12 is provided in front of the two-dimensional image sensor 11 to substantially focus the center area of the film negative 2. On the back of the image data detecting apparatus 10 is attached a substrate board 13 for mounting a processing circuit comprising integrated circuits and so on.

The two-dimensional image sensor 11 comprises, as shown in FIG. 2, an image pickup section 101 for optically picking up an image, a storage section 102 for storing charges transmitted from the image pickup section 101, and an output register 103 for outputting the charge stored in the storage section 102. By controlling driving signals 101S through 103S from a driving circuit, the image data in two-dimensions is photoelectrically converted and outputted serially from the output register 103 in the form of an analog image signal PS. The circuit mounted on the substrate board 13 has, for example, a circuit structure as shown in FIG. 3. The image sensor 11 is driven by driving signals 101S through 103S supplied from the driving circuit 20. The light illuminating the image pickup section 101 of the image sensor 11 is outputted from the output register 103 as a picture signal PS, sampled and held by a sample-and-hold circuit 21 at a predetermined sampling cycle. The sampled data is converted by an analog-to-digital (A/D) converter 22 into digital signals DS. The digital signals DS from the A/D converter 22 are inputted to a logarithmic converter 23 for obtaining density signals DN. Then the density signals DN are written in a memory 25 through a write-in control circuit 24 which is controlled by a reading speed signal RS from the driving circuit 20.

A reading speed signal RS from the driving circuit 20 is inputted into the write-in control circuit 24 in order to read out image data at a predetermined speed when the image sensor 11 is driven. The write-in control circuit 24 writes in the density signals DS at predetermined positions of a memory sequentially and correspondingly with the driving speed of the image sensor 11. In other words, the reading speed of the image sensor 11 is determined by the driving speed. The reading speed in turn determines the segmentation number of picture elements with respect to an image area. The memory 25 should therefore store the detected data in correspondence with the number of pixels, too.

When a picture is printed in a conventional manner in the above mentioned structure, the light transmitted through one frame of a film negative 2, which has been conveyed to an standing still at a printing position, is detected by photosensors 8. Then, the filters in the color compensation means 3 are adjusted in response to the picture signals for each of the primary RGB colors (i.e.—red, green, and blue) and the black shutter 6 is opened to expose the photographic paper 7 with the proper exposure value.

An image data detecting apparatus 10 comprising a two-dimensional image sensor 11 of an area scanning type such as a CCD is mounted at a position near the film negative 2 at an inclined angle with respect to an optical axis LS to facilitate the mounting thereof. The whole frame of the film negative 2 is segmented into a large number of arrayed pixels for detecting image data. In other words, when predetermined driving signals 101S through 103S are fed from the driving circuit 20 to the image sensor 11, the two dimensional image sensor 11 is adapted to receive the light transmitted through the film negative 2 on the printing section via the lens unit 12. The two-dimensional image sensor 11 can therefore scan the whole surface of a frame of the film negative 2 along the scanning lines SL sequentially by segmenting the whole area into a large number of small arrayed pixels 2A as shown in FIG. 4A. In accordance with the scanning of the whole area, the output register 103 of the image sensor 11 outputs picture signals PS sequentially, then the picture signals PS are sampled and held by a sample-and-hold circuit 21 and the sampled values thereof are converted by an A/D converter 22 into digital signals DS. The digital signals DS from the A/D converter 22 are logarithmically converted by a logarithmic converter 23 to density signals DN. The density signals DN are controlled by a write-in control circuit 24 to be stored in a memory in the arrays corresponding to the pixels 2A shown in FIG. 4B and in terms of the density digital values of the negative film 2.

If the digital values for respective pixels of the film negative 2 or the density values for respective pixels with respect to three primary colors are stored in the memory 25, it is possible to read out the digital values for any particular pixel of the film negative 2 from the memory 25. If the density values for respective three primary colors of R, G and B when using mosaic filters (not shown) are stored as shown in FIG. 4B, it is possible to read out such values from the memory for processing (which will be described hereinafter) in order to determine the exposure or correction values for photographic printing in the same manner as in the prior art.

The image sensor 10 consists of a predetermined number of elements, and in accordance with the number of elements, the number of divided elements of the whole surface of the image are physically decided. In the case where the image sensor 10 is moved relatively with respect to the film negative 2, however, the number of elements may be changed by changing the read-out speed.

The image data, as shown in FIG. 4B, detected and stored by the image sensor 25 in the manner described above, does not exhibit correct data of the image itself of the film negative 2 due to the influences of an unevenness of the elements constituting the image sensor 10, a shading of the light source 4, an aberration of the lens unit 11 and the difference in the base density of the film negative 2. For the reasons described above, in the case where it is necessary to use the stored data from the memory 25 as is, the influence of the unevenness of the constituting elements is directly felt, and accordingly, correct image data cannot be obtained. In addition, in case of an original color film, it is necessary to store in the memory the image data regarding the three respective primary colors R, G and B. However, in the prior art method, color unbalance may be caused by the local fading of the filters with respect to the primary colors, and moreover, color temperature variations and base color differences of the film negative 2 may be observed due to chronological changing of the light source. These adverse phenomena may result in the loss of the white balance.

SUMMARY OF THE INVENTION

An object of this invention is to eliminate defects or disadvantages encountered in the prior art and to provide a method for detecting correct data regarding a colored image which is faithful to the original picture and storing the thus detected image data by preliminarily carrying out the data calibration for the respective three primary colors.

According to this invention, this and other objects can be achieved by the method for correcting data regarding a color photographic image in a method of detection of color photographic image data in which a light from a light source transmitted through or reflected by an original color film irradiated by the light source is received by an image sensor, e.g. a two-dimensional image sensor, with respect to three primary colors of red, green and blue, respectively, and image data of the original color film is detected with respect to picture elements obtained by dividing the picture surface and also with respect to the respective three primary colors, the correction method being characterized in that image data of a reference film corresponding to the original film with respect to the three primary colors respectively is detected by the image sensor; the thus detected data is stored in a memory as calibration data, and the image data of the original film is operated upon and processed in connection with the calibration data every time that the image data of the original film is detected by the image sensor so as to thereby obtain corrected image data.

The nature, principle and utility of the invention will become more apparent from the following detailed description when read in conjunction with the accompanying drawings.

BRIEF DESCRIPTION OF THE DRAWINGS

In the accompanying drawings:

FIG. 3 is a block diagram representing a controlling system for the two-dimensional image sensor;

FIGS. 4A and 4B are views which show the corresponding relationship between the division of the picture element of the original film and the memory data;

DESCRIPTION OF THE PREFERRED EMBODIMENTS

Figure 1:
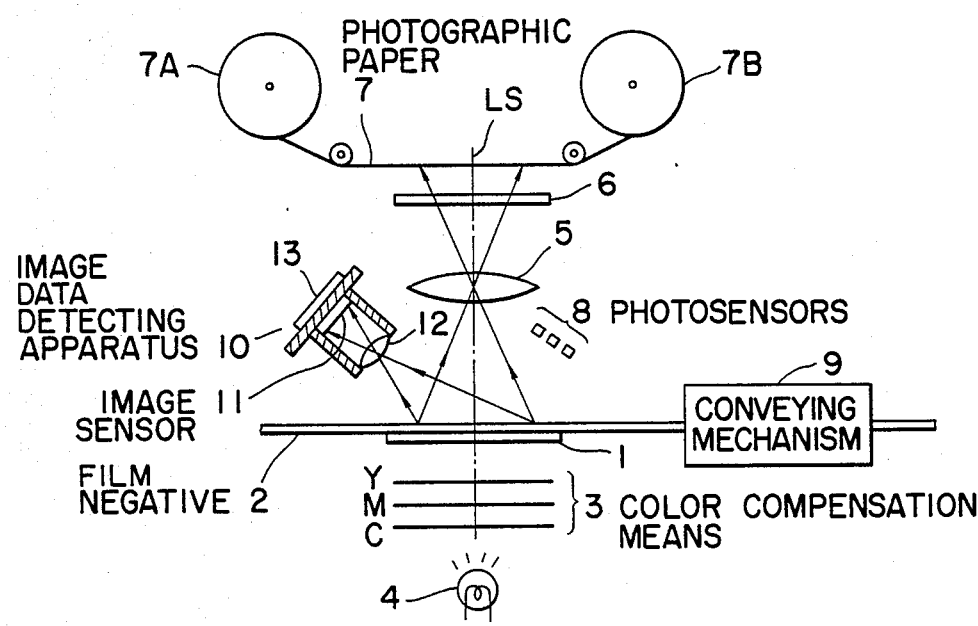
FIG. 1 is a schematic view which shows one example of arrangement of a photographic printing system to which this invention is applicable.
Figure 2:
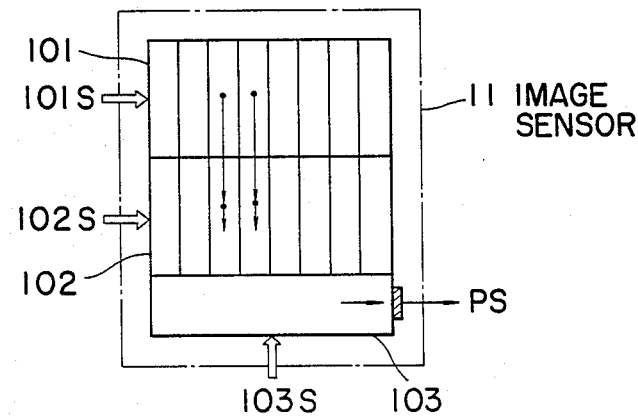
FIG. 2 is a structural view of a two-dimensional image sensor.
Figure 5:
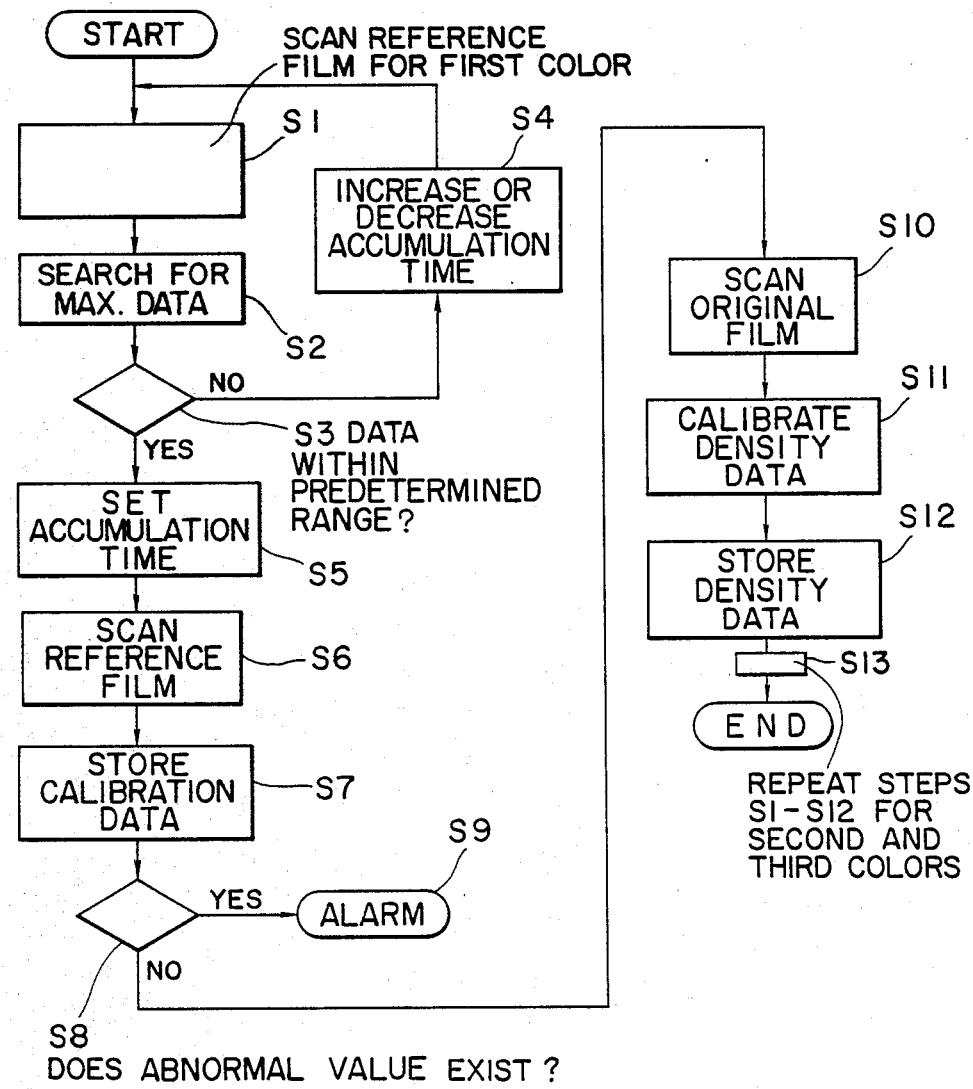
FIG. 5 is a flowchart which represents the method of this invention.

The operation of the correction method according to this invention is done on the basis of a flowchart as shown in FIG. 5 and the system represented by FIGS. 1 and 2 will be used for carrying out the process corresponding to the flowchart. Note that for simplicity, FIG. 5 does not show that each step is performed three times for the three respective primary colors of red, green, and blue. See, however, step S13 which, in a shorthand way, indicates that the steps of FIG. 5 are performed for three colors.

Figures 6A, 6B, 7:
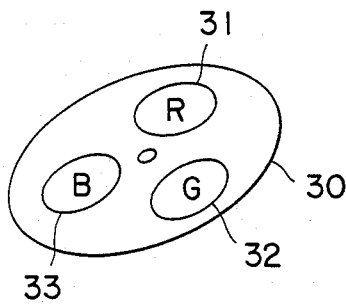
FIGS. 6A and 6B are views which show data for calibration and the corrected image data, respectively.
FIGS. 7 and 8 are schematic views of constructions for detecting image data of the respective three primary colors.

According to this invention, a blanked portion of a reference film of the same type (that is, the same manufacturer of the photo-sensitive material, film size, film kind or the like) as that of the color film negative (original film) 2 is conveyed so as to align with the light axis LS, and the output signal DS of the A/D converter 22 is directly inputted into the read-out control circuit 24 without using the logarithmic conversion circuit 23; switch A is used to control whether or not the converter 23 is bypassed. The output signal DS is inputted to the read-out control circuit 24 by the image sensor 10 with the accumulated time (for example, minimum time of the rated value) predetermined with respect to the respective colors R, G and B using the filters of these respective three primary colors, so as to thereby scan the reference film (Step S1), and to search data with respect to the maximum anti-logarithm value of the reference film, i.e. the most brilliant portion in the reference film (Step S2). The, with respect to the respective R, G and B colors, a determination is made as to whether or not the anti-logarithm data value is within the predetermined range, i.e. whether or not the lightness of the most brilliant portion in the reference film is within the predetermined range (Step S3), and if it is not within the predetermined range, an increase or decrease of the accumulation time is required (Step S4). In the case where the maximum anti-logarithm data value is smaller than the lower limit value, the accumulation time is elongated to increase the accumulated amount, and on the other hand, when the data is larger than the upper limit value, the accumulation time will be shortened to reduce the accumulated amount. In either case, these operations are repeated until the maximum data value is included within the predetermined range. When the maximum anti-logarithm data value of the reference film is set within the predetermined range in accordance with the operations referred to above, the accumulation time of the image sensor 10 is set at this accumulation time with respect to the respective colors R, G and B (Step S5). The reference film is then again scanned using the logarithmic conversion circuit 23 by the operation of the image sensor 10 (Step S6). At this time, since the reference film is blank such that no picture image is photographed, the image density data at the time when the reference film is scanned should be all represented as "0" with respect to the colors R, G and B. However, various influences such as unevenness of the elements of the image sensor 10, shading of the light source and an aberration in the lens unit 11 occur, in the image detecting system, and for this reason, as shown in FIG. 6A, there are portions showing values other than "0". This data is outputted with respect to the colors R, G and B in the image detecting system, and in case of the image detection, the data is always outputted in the condition contained in the image density data, so that the data is stored in the memory 25 as calibration data for the respective colors R, G and B (Step S7).

In the next step, a predetermination is made as to whether or not data regarding an abnormal value, which is abnormally larger than that of the peripheral image data, exists in the calibration data stored in the memory 25 for the respective colors R, G and B as shown in FIG. 6A (Step S8), and when an abnormal value is observed, an alarm is outputted to inform an operator of the adhesion of dirt, dust or the like on the lens system (Step S9).

On the other hand, in case of no abnormal value in the calibration data, the reference film is removed from the lens system and the film negative 2, whose image is to be detected, is conveyed into the lens system by means of the conveying mechanism 9 to perform the scanning operation for the detection of the image with respect to the colors R, G and B by the image sensor 10 (Step S10). In this case, since image density data such as shown in FIG. 4B is obtained, the density data can be corrected by subtracting the calibration data for the respective colors R, G and B obtained previously (Step S11) and the corrected data, which is to be described in FIG. 6B, is stored as image density data to be used with respect to the respective colors R, G and B (Step S12). Accordingly, it will be found that the density data as shown in FIG. 4B and the calibration data as shown in FIG. 6A correspond to each other with respect to the respective picture elements, and the data for calibrating the picture elements Sij in FIG. 6A is subtracted from the density data of the picture element Sij in FIG. 4B with respect to the respective colors R, G and B to correct the data, and the corrected data or values are subsequently stored as corrected image data to be used in the area other than the memory 25, for example, as shown in FIG. 6B. Accordingly, the image density data in which the unevenness in the detecting system is compensated for can be obtained with respect to the three primary colors R, G and B.

It is not necessary to detect and store the calibration data based on the reference film every time, and usually, the detection and the storage of the calibration data may be preferably performed for every lot of the primary processing operation.

Figure 8:
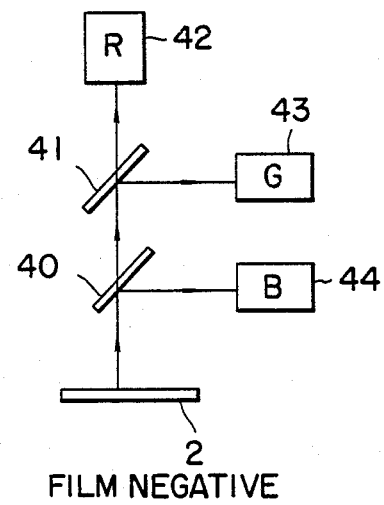

As shown in FIG. 7, the image density data for the respective three primary colors R, G and B are obtained by setting filters 31, 32 and 33 for the respective three colors to a rotatable disc plate 30 so as to thereby detect the respective image density data by rotating the disc 30 in front of one image sensor 10. Furthermore, as shown in FIG. 8, the image density data of the three primary colors R, G and B may be detected by locating dichroic mirrors 40 and 41 on the light axis through the film negative 2 and setting image sensors 42, 43 and 44 with respect to the corresponding three colors R, G and B on the respective beam split light paths. In addition, it will be also possible to detect the image density data by closely bonding mosaic or stripe filters of the respective three primary colors R, G and B on the front surface of the image sensor.

In the foregoing description, it is described that the image data of the original film is corrected in accordance with the calibration data preliminarily obtained and stored during the read-out operation of the same, but the image data may be corrected by once storing the data in the memory and then correcting the same. It will also be noted that the number of the image sensors can be optionally selected on the basis of the size of the original film, the magnification of the lens system, the required number of picture elements of the picture surface and the like. In addition, the image sensor is not limited to the charge coupled device and the other means which can divide the picture surface into a plurality of elements and detect the divided elements may be preferably utilized.

Furthermore, in the foregoing embodiment, although the correction is performed by the subtraction utilizing the density data, the correction will be of cause carried out by the division in case of an operation using the anti-logarithmic value. The multiplication may be performed by preparing the data table of the inverse number of the anti-logarithmic value in place of the use of the logarithmic table. As the adjustment of the sensitivity, although the example in which the accumulation time is increased or decreased is introduced, the adjustment of the sensitivity may be done by increasing or decreasing the amount of light from the light source using filter means. Moreover, in the described embodiment, although the application of this invention is to the photographic printing system, this invention can be applied to the storage into a memory medium such as magnetic tape, optical disc and magnetic disc film by substantially the same manner as that described hereinbefore.

According to the calibration method of this invention, influences such as unevenness naturally observed in the detection system are obtained and stored with respect to the respective three primary colors R, G and B and actual color image data is corrected by the stored data, so that correct data regarding an original color picture can be obtained.

Figure 9A:
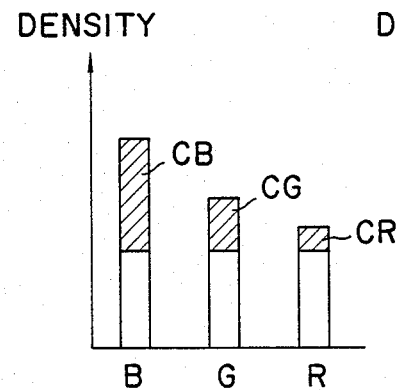
FIGS. 9A and 9B are views for explaining the correction of the white balance.
Figure 9B:
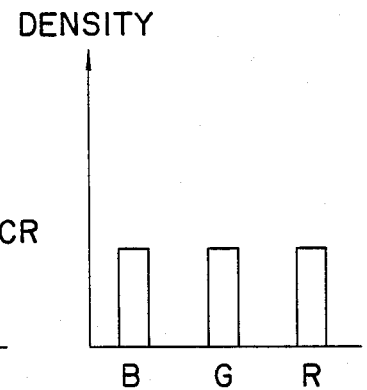

FIG. 9A shows a graph representing detected density data (i.e. the density values obtained in accordance with the Step S10 shown in FIG. 5) of the respective three colors R, G, and B including calibration data CR, CG and CB. The density data is respectively calibrated with respect to the colors R, G and B according to the correction method of this invention (Step S11), so that the calibration data CR, CG and CB are removed and then the density data is stored (Step S12). Accordingly, the density data is identified as shown in FIG. 9B so as to thereby automatically maintain the white or gray balance.

It should be understood that many modifications and adaptations of the invention will become apparent to those skilled in the art and it is intended to encompass such obvious modifications and changes in the scope of the claims appended hereto.

I claim:

1. A method for correcting data regarding a color photograhic image in a method of detection of color photographic image data, in which light from a light source is transmitted through or reflected by an original color film irradiated by the light source and is received by an image sensor and image data of the original color film is detected for picture elements into which the original color film is divided with respect to three primary colors of red, green, and blue, said method for correcting data comprising the steps of:

detecting image data of a reference film corresponding to said original color film with respect to said three primary colors;
   storing the detected data as calibration data; and
   operating upon and processing image data of said original color film in accordance with said calibration data every time that image data of said original color film is detected by the image sensor so as to thereby obtain corrected image data.

2. A method for correcting data as claimed in claim 1, wherein said image sensor is a two-dimensional image sensor.

3. A method for correcting data as claimed in claim 1, wherein said stored calibration data and said image data of said original color film are both density data.

4. A method for correcting data as claimed in claim 3, wherein said step of operating upon and processing image data includes subtraction of said stored calibration data from said image data.

5. A method for correcting data as claimed in claim 1, further comprising the step of outputting an alarm when an abnormal value of said calibration data is detected.

* * * * *